(12) United States Patent
Yamauchi et al.

(10) Patent No.: US 6,563,244 B1
(45) Date of Patent: May 13, 2003

(54) COMPOSITE-TYPE ELECTROMAGNET AND RADIAL MAGNETIC BEARING

(75) Inventors: Akira Yamauchi, Narashino (JP); Okikazu Kuwahara, Narashino (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/626,432

(22) Filed: Jul. 27, 2000

(30) Foreign Application Priority Data

Jul. 28, 1999 (JP) .......................................... 11-214423

(51) Int. Cl.[7] .......................... H02K 21/38; H02K 7/09; H02K 1/18; H02K 1/12
(52) U.S. Cl. ................. 310/90.5; 310/181; 310/154.02; 310/154.07; 310/254; 310/218
(58) Field of Search ........................... 310/90.5, 154.07, 310/154.08, 154.26, 218, 254, 154.02, 154.01, 42, 181

(56) References Cited

U.S. PATENT DOCUMENTS

| | | | |
|---|---|---|---|
| 3,984,711 A | * 10/1976 | Kordik | 310/154.07 |
| 4,703,212 A | * 10/1987 | Aboukrat et al. | 310/181 |
| 5,216,308 A | * 6/1993 | Meeks | 310/90.5 |
| 5,355,042 A | 10/1994 | Lewis et al. | 310/90.5 |
| 5,578,880 A | 11/1996 | Lyons et al. | 310/90.5 |
| 5,825,112 A | * 10/1998 | Lipo et al. | 310/181 |
| 6,121,704 A | * 9/2000 | Fukuyama et al. | 310/90.5 |

FOREIGN PATENT DOCUMENTS

| | | |
|---|---|---|
| DE | 2511567 | 9/1976 |
| JP | 58184319 | 10/1983 |

* cited by examiner

*Primary Examiner*—Nestor Ramirez
*Assistant Examiner*—Guillermo Perez
(74) *Attorney, Agent, or Firm*—Adams & Wilks

(57) ABSTRACT

A composite-type electromagnet for a radial magnetic bearing has four composite-type electromagnet parts. Each part has four electromagnet cores formed of a magnetic material. The cores each have two protruding poles. A control coil is wound around each of the protruding poles and a biasing permanent magnet is disposed between each of the cores. The electromagnet cores and the biasing permanent magnets are in direct contact such that only a minute gap exists at a junction therebetween. A viscous material, adhesive material, or a magnetic fluid such as grease, having therein a material having high permeability and high saturation magnetic flux density is disposed in the minute gap so as to minimize magnetic flux leakage at the junction.

13 Claims, 15 Drawing Sheets

COMPOSITE-TYPE ELECTROMAGNET AND RADIAL MAGNETIC BEARING

BACKGROUND OF THE INVENTION

1. Field of the Invention

The present invention relates to a composite-type electromagnet structured by a combination of an electromagnet having a control coil wound on an electromagnet core and a radial permanent magnet, and to a radial magnetic bearing provided with this composite-type electromagnet.

2. Description of the Related Art

Radial magnetic bearings, which are used for rotatably supporting a rotary shaft of a rotary apparatus such as a motor without making contact therewith, are structured by position sensors, controlling electromagnets and biasing electromagnets. However, there are proposals for employing an electromagnet for both controlling and biasing in order to simplify the structure. The position sensor is used to detect displacement of the rotary shaft in the radial direction and provides a detection signal to a magnetic bearing control device. The biasing electromagnet provides a biasing magnetic flux of a constant magnitude to the rotary shaft through a gap between the rotary shaft and the radial magnetic bearing. The controlling electromagnet serves to apply, in accordance with an output signal from the magnetic bearing control device, a controlling magnetic flux to the rotary shaft via the gap and return the displaced rotary shaft to a predetermined position and hold it in that position.

Because the biasing magnetic field is constant, if it is supplied by a permanent magnet, the biasing electromagnet is unnecessary. If this is done, the lack of need of a biasing current to be flown to an excitation coil of the biasing electromagnet greatly reduces power consumption and heat generation of the radial magnetic bearing. Furthermore, because the number of cores and coils for the biasing electromagnet are reduced, the apparatus size and cost can be reduced. Because these various merits are available, proposal and development are being made for the radial magnetic bearings adopting a composite-type electromagnet combined with a biasing permanent magnet and a controlling electromagnet.

The radial magnetic bearing conventionally disclosed has, as shown in FIG. 10, a plurality of biasing-magnetic-field permanent magnets 54a, 54b, 54c, 54d arranged equidistant at inner positions in a widthwise center of an annular yoke 57. These permanent magnets are clamped between an inner surface of the annular yoke 57 and back surfaces of inner magnetic poles 52a, 52b, 52c, 52d. Each inner magnetic pole has an excitation coil 53a, 53b, 53c, 53d provided on a periphery of a leg thereof. Further, a pair of disc-formed outer magnetic poles 55, 56 defining a plurality of magnetic poles are provided on respective sides of the annular yoke 57 so that the inner magnetic poles and the outer magnetic poles can form a magnetic circuit. Thus, the radial magnetic bearing conventionally disclosed is characterized in that an attracting force of the biasing permanent magnet can be adjusted by varying the thickness of the backside of the inner magnetic pole and a gap between a backside side position and the outer magnetic pole.

Meanwhile, another radial magnetic bearing is a radial magnetic bearing low in current consumption structured as shown FIG. 11. That is, a housing 67 has electromagnet cores 62a, 62b, 62c, 62d in a squared-U form circumferentially arranged around a rotary shaft 69. These electromagnet cores are wound around with excitation coils 63a, 63b, 63c, 63d, and biasing permanent magnets 64a, 64b, 64c, 64d arranged in one-part section thereof. Also, the rotary shaft 69 has a rotor core 66 as a circumferential laminate with an I-type electromagnetic steel plate disposed facing the electromagnet cores 62a, 62b, 62c, 62d. Based on a position sensor signal for detecting a radial position of the rotary shaft 69, a magnetic bearing control device not shown supplies a control current to the excitation coils 63a, 63b, 63c, 63d, thereby controlling a radial position of the rotary shaft 69.

Furthermore, another radial magnetic bearing is a magnetic bearing having, as shown in FIG. 12, a stator arranged around a rotary shaft 79 to apply magnetism to the rotary shaft 79 from the stator to hold the rotary shaft 79 constant on the axis, thus being simple in structure and usable for a large-sized bearing. That is, the stator is structured by electromagnet cores 72a, 72b, 72c, 72d extending along an axial direction and arranged circumferentially, control coils 73a, 73b, 73c, 73d wound around the electromagnet cores, a pair of disc-formed stator yokes 75, 76 respectively fixed on the ends of the electromagnetic cores, a biasing permanent magnet 74 that is a cylindrical permanent magnet connecting between inner sides of the control coils of the stator yokes and magnetized in the axial direction.

In the meanwhile, although not limited to those as the above for use in radial magnetic bearings, in a composite-type electromagnet combined with a permanent magnet and an electromagnet, a magnetic member forming an electromagnet core and a permanent magnet has a bonded junction, e.g. by an epoxy adhesive or joined by mechanically clamping. In the junction between the permanent magnet and the electromagnetic core thus bonded, there always exists a gap though different in degree due to assembling. Though being dependent upon electromagnet size, forming accuracy, etc., the gap is nearly several hundreds $\mu$m, which in some cases is an air gap and in other cases a presence of a non-magnetic material such as adhesive. In both cases, it is a factor for preventing magnetic flux flow. This results in problems such as failing to obtain a desired magnetic force or imbalance in magnetic force or further occurrence of magnetic flux leak to the outside thus causing adverse effects upon external apparatuses.

As concerned with putting into practical use a composite-type electromagnet or a radial magnetic bearing having this composite-type electromagnet, there is a problem with prevention of magnetic flux flow in the junction of a magnetic-material electromagnet core and a permanent magnet, besides a problem with adjustment of a biasing magnetic field.

The problem that the invention is to solve is, in a composite-type electromagnet or a radial magnetic bearing having this composite-type electromagnet comprising an electromagnet having a controlling coil wound around an electromagnet core of a magnetic material and a biasing permanent magnet having a junction between the electromagnet core and the permanent magnet, to minimize the leak of magnetic flux occurring at the junction not to reduce the amount of magnetic flux available and prevent bad effects upon an external member, apparatus or the like due to leak magnetic flux.

SUMMARY OF THE INVENTION

In order to solve the above problem, a composite-type electromagnet comprises an electromagnet having a controlling coil wound around an electromagnet core of a magnetic material and a biasing permanent magnet having a junction between the electromagnet core and the permanent magnet, wherein a filling material made of a material having a high permeability and a high saturation magnetic flux density is disposed in the junction.

BRIEF DESCRIPTION OF THE DRAWINGS

FIG. 10 is a figure showing a first example of a conventional radial magnetic bearing, wherein

FIG. 11 is a figure showing a second example of a conventional radial magnetic bearing wherein FIG. 12 is a figure showing a third example of a conventional radial magnetic bearing, wherein

DESCRIPTION OF THE PREFERRED EMBODIMENTS

Figure 1:
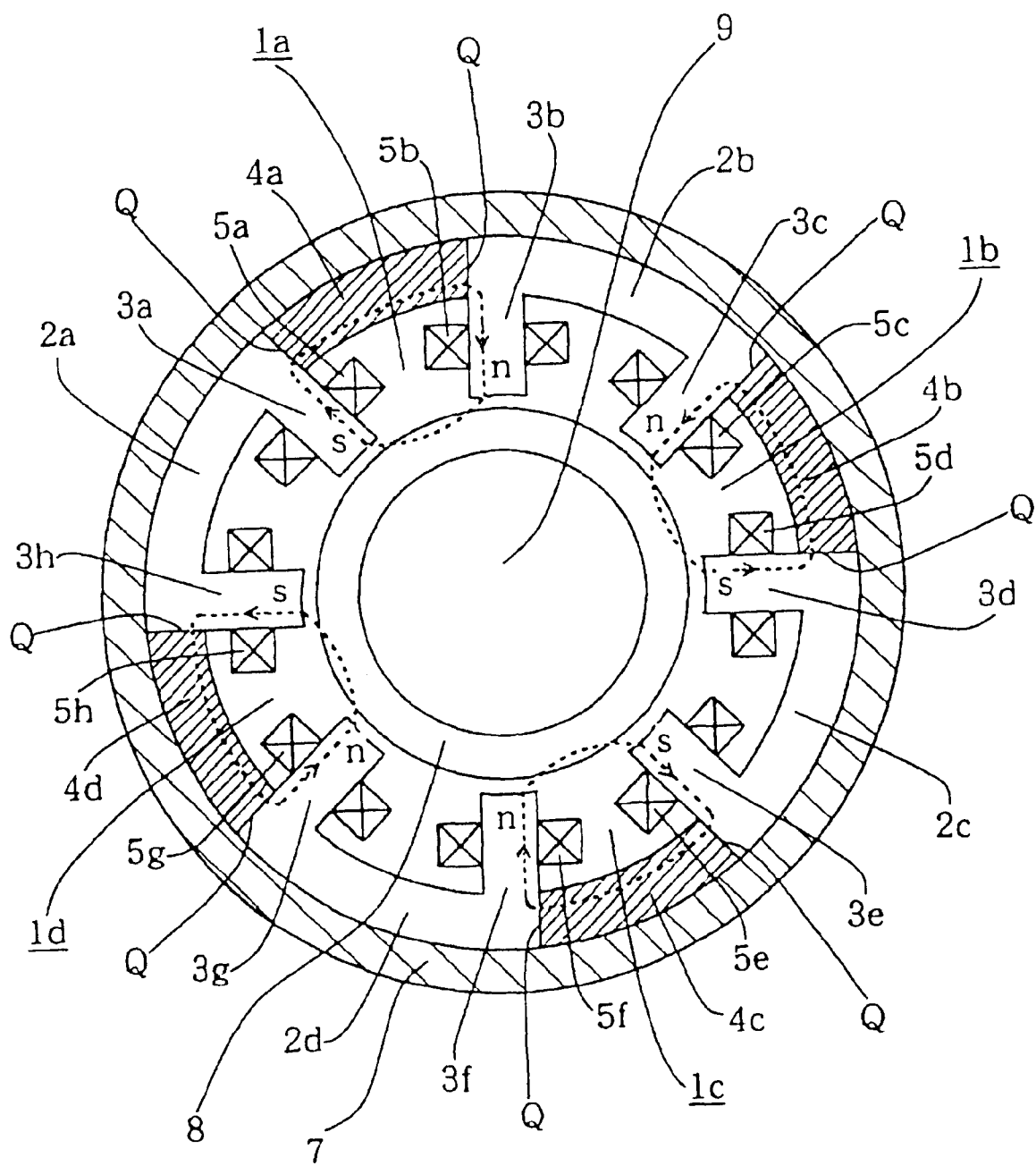
FIG. 1 is a cross sectional view of a radial magnetic bearing of one embodiment of the present invention.
Figure 2:
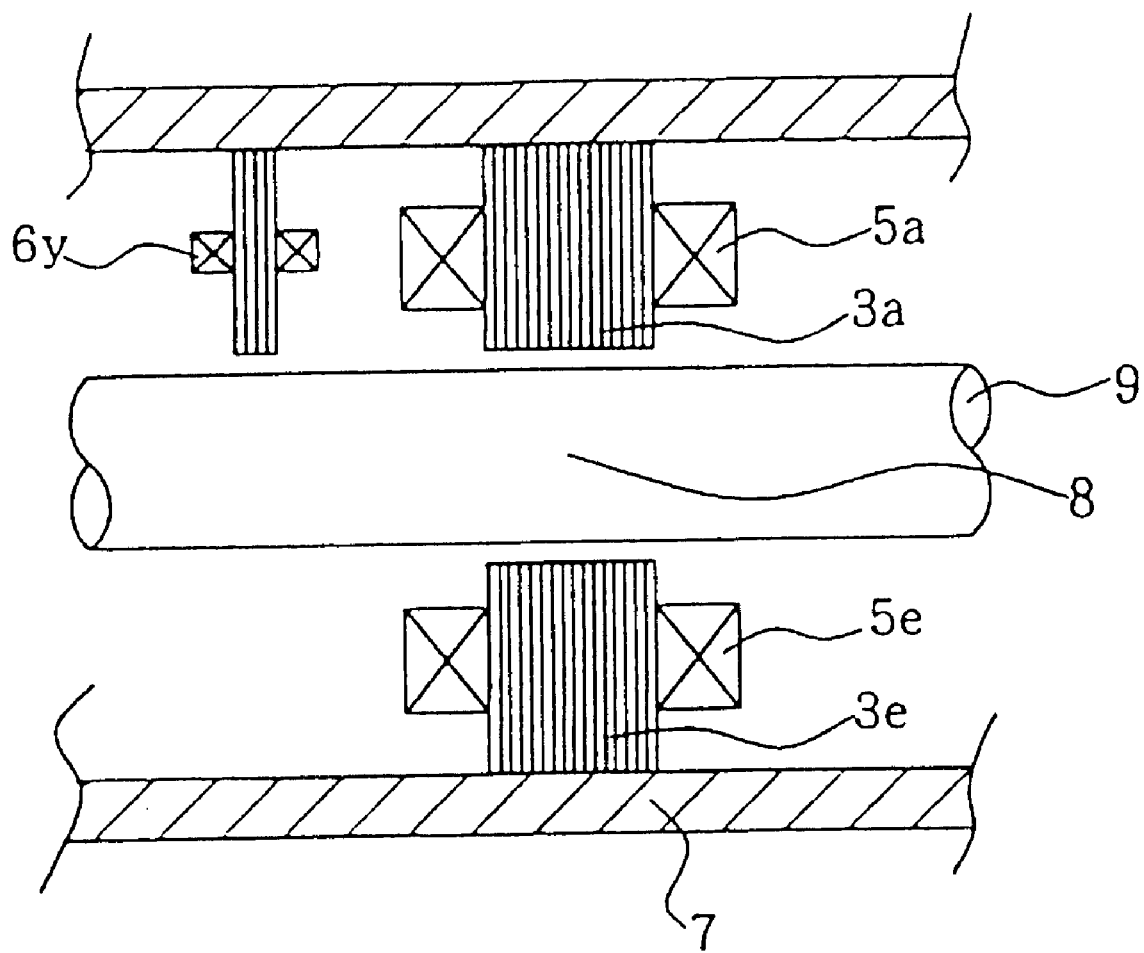
FIG. 2 is a longitudinal sectional view of the radial magnetic bearing of one embodiment of the present invention.
Figure 5:
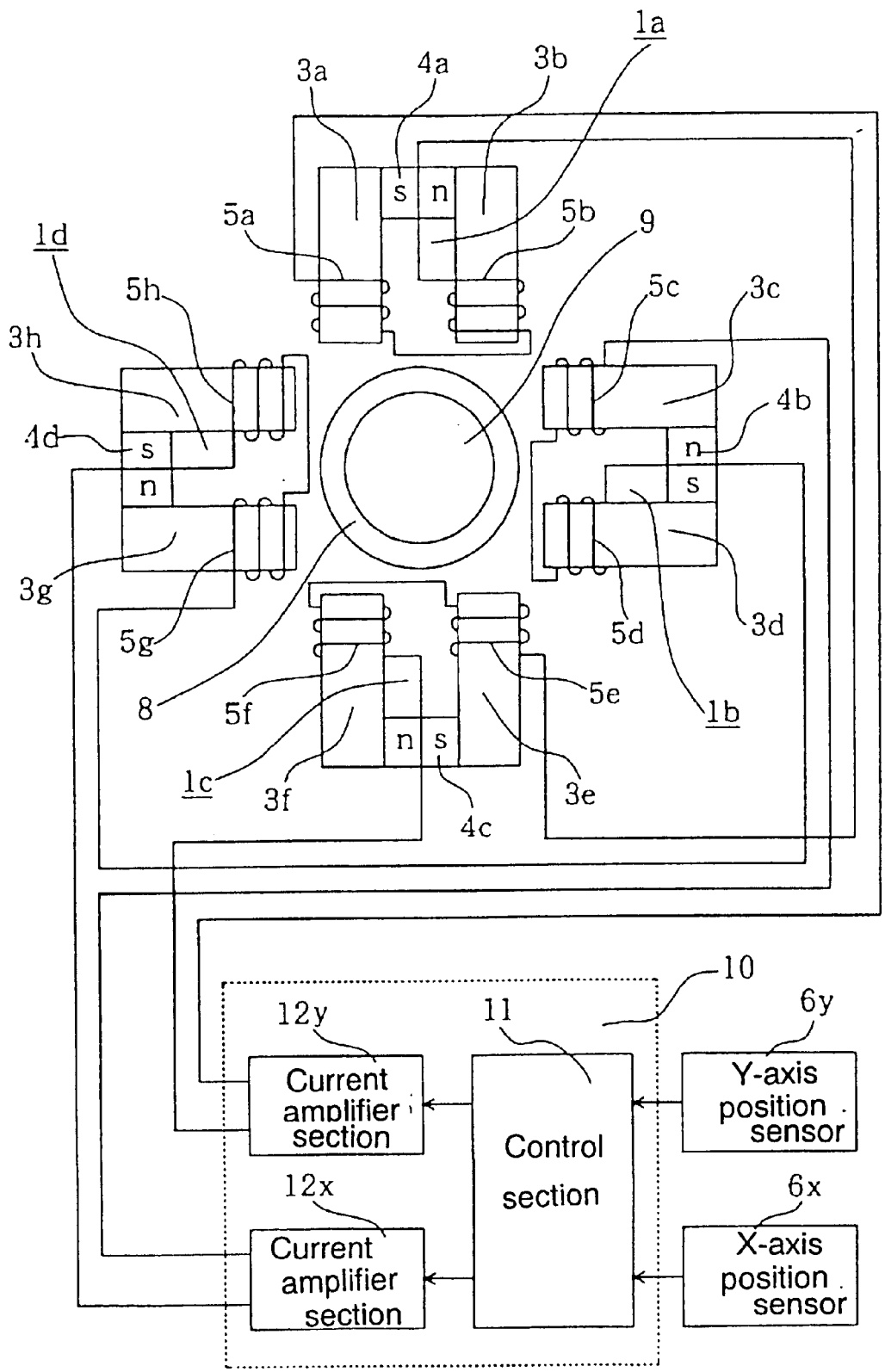
FIG. 5 is a controlling block diagram of the radial magnetic bearing of FIG. 1.

A radial magnetic bearing of one embodiment of the present invention is structured by composite type electromagnets structured by four electromagnet cores 2a, 2b, 2c, 2d, four biasing permanent magnets 4a, 4b, 4c, 4d and eight control coils 5a, 5b, 5c, 5d, 5e, 5f, 5g, 5h, radial position sensors 6x, 6y, a cylindrical case 7 of a non-magnetic material accommodating the composite type electromagnet part and the position sensors, and a rotary shaft 9, as shown by a cross sectional view in FIG. 1 and a partial longitudinal sectional view in FIG. 2 and a control block diagram in FIG. 5. The rotary shaft 9 of a non-magnetic material, constituting a part of the rotor, has a magnetic material target 8 formed on a surface thereof.

Figure 3:
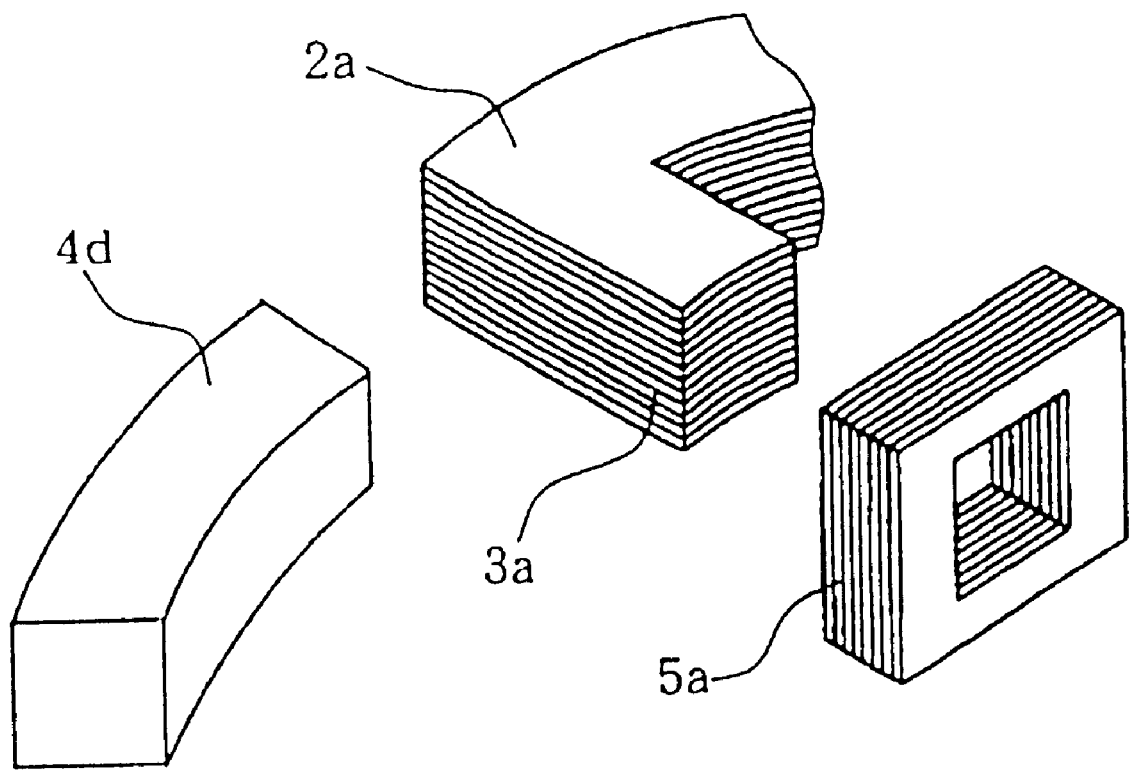
FIG. 3 is a partial perspective view of an electromagnet core, a controlling coil and a biasing permanent magnet.

The electromagnet core 2a–2d having two protrusion poles comprises laminated core pieces fabricated through blanking a material such as a silicon steel plate into a predetermined shape, as shown by a partial perspective view in FIG. 3. Meanwhile, the biasing permanent magnet 4a–4d is a permanent magnet generally in a rectangular-parallelepiped form, similarly as shown by a perspective view in FIG. 3. The four electromagnet cores 2a–2d each having two poles and the four biasing permanent magnets 4a–4d are alternately arranged to form one annular body, and accommodated and fixed within the non-magnetic cylindrical case 7.

Figure 4:
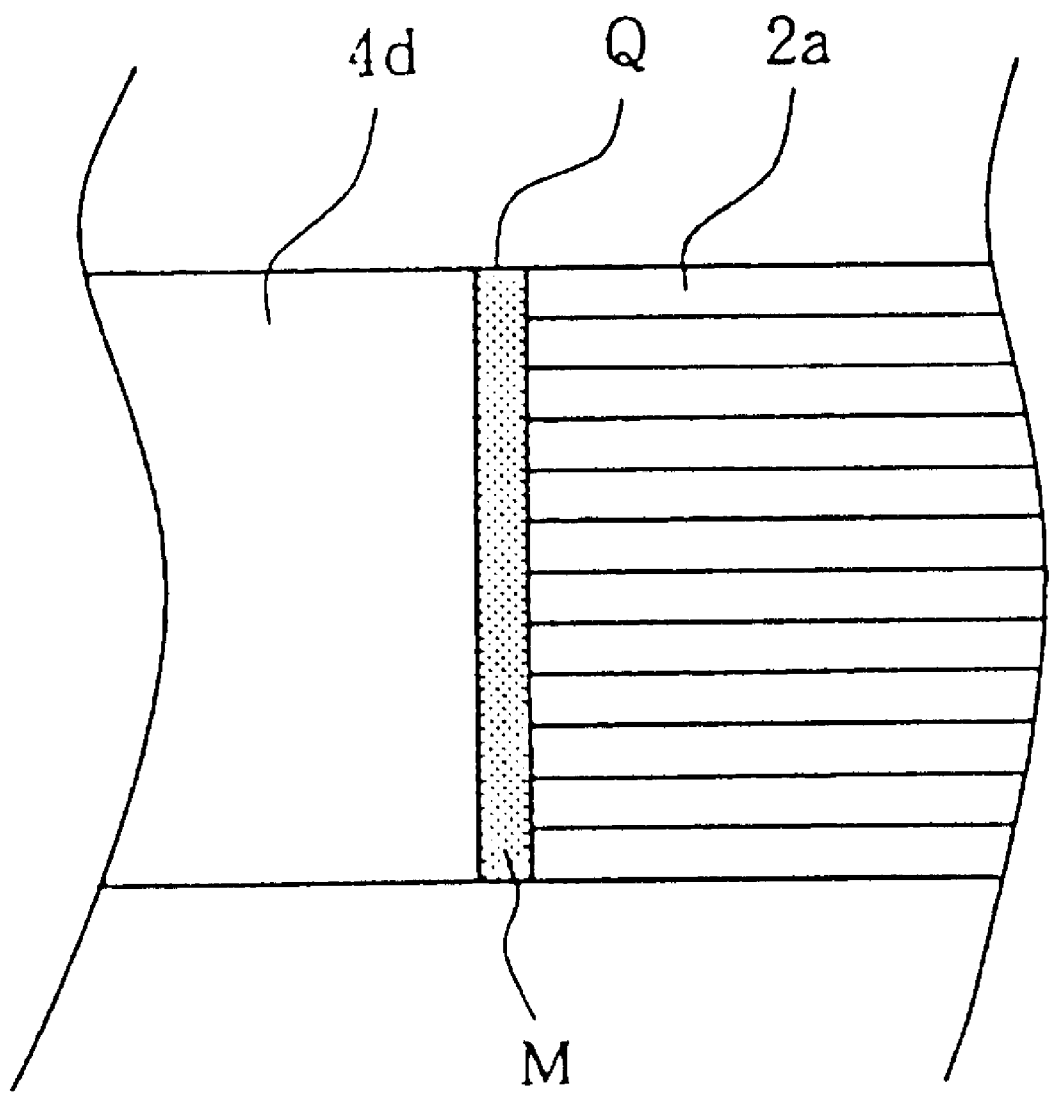
FIG. 4 is a partial sectional view showing a junction of the electromagnetic core and the biasing permanent magnet with a gap exaggerated.

The electromagnet cores 2a–2d and the biasing permanent magnets 4a–4d have junctions Q at two points for each or totally 8 points. The junction Q is disposed therein with a filling material M having high permeability and saturation magnetic flux density, as shown exaggeratedly with the gap in FIG. 4. In the case of mechanically joining the junction Q, the junction Q is filled with a viscous material such as grease prepared based on a material high in permeability and saturation magnetic flux density or disposed with a magnetic fluid. This conspicuously decreases magnetic resistance of the junction Q down to nearly that of the magnetic-member electromagnet core. The junction Q may be joined with an adhesive prepared based on a material high in permeability and saturation magnetic flux density. In such a case, mechanical joining is unnecessary or auxiliary. Here, the grease or adhesive prepared based on a material having high permeability and saturation magnetic flux density is to be obtained by mixing a powder, for example, of pure iron, silicon steel or ferrite in silicone grease or an epoxy or acrylic adhesive and thoroughly stirring them.

In the composite-type electromagnet above, the electromagnet core 2a is formed at opposite ends with protruding poles 3h and 3a, the electromagnet core 2b at opposite ends with protruding poles 3b and 3c, the electromagnet core 2c at opposite ends with protruding poles 3d and 3e, and the electromagnet core 2d at opposite ends with protruding poles 3f and 3g. The control coil 5a, 5b, 5c, 5d, 5e, 5f, 5g, and 5h are respectively wound around the protruding poles 3a, 3b, 3c, 3d, 3e, 3f, 3g, and 3h. As shown in FIG. 5, a control current is supplied from a magnetic bearing control device 10 to the control coils 5a–5h.

That is, the control coils 5a and 5b and the oppositely-arranged control coils 5e and 5f are connected in series and supplied with a control current from a Y-axis current amplifier section 12y of the magnetic bearing control device 10. The control coils 5c and 5d and the oppositely-arranged control coils 5g and 5h are connected in series and supplied with a control current from an X-axis current amplifier section 12x of the magnetic bearing control device 10.

With such arrangement and connection, a horse-hoof form of +Y-axis composite-type electromagnet section 1a is composed of the biasing electromagnet 4a and the protruding pole 3a and control coil 5a wound thereon as well as the protruding pole 3b and the control coil 5b wound thereon. A horse-hoof form of −Y-axis composite-type electromagnet section 1c is composed of the biasing electromagnet 4c and the protruding pole 3e and control coil 5e wound thereon as well as the protruding pole 3f and the control coil 5f wound thereon. A horse-hoof form of +X-axis composite-type electromagnet section 1a is composed of the biasing electromagnet 4b and the protruding pole 3c and control coil 5c wound thereon as well as the protruding pole 3d and the control coil 5d wound thereon. Further, a horse-hoof form of −X-axis composite-type electromagnet section 1d is composed of the biasing electromagnet 4d and the protruding pole 3g and control coil 5g wound thereon as well as the protruding pole 3h and the control coil 5h wound thereon.

In each composite-type electromagnet section, a biasing magnetic field is generated by the biasing permanent magnet 4a–4d, as shown by a dotted-line magnetic flux line in FIG. 1. On the same axis, as shown in FIG. 5 to FIG. 9, a control magnetic field through one composite-type electromagnet section is generated in the direction of intensifying the biasing magnetic field and through the other composite-type electromagnet section arranged opposite is in the direction of weakening the biasing magnetic field. That is, when the control coils 5a and 5b in the +Y-axis composite-type electromagnet section 1*a* generate a control magnetic field in the same direction as the biasing magnetic field, the oppositely-arranged control coils 5*e* and 5*f* in the −Y-axis composite-type electromagnet section 1*c* generate a control magnetic field in the reverse direction to the biasing magnetic field. Similarly, when the control coils 5*c* and 5*d* in the +X-axis composite-type electromagnet section 1*b* generate a control magnetic field in the same direction as the biasing magnetic field, the oppositely-arranged control coils 5*g* and 5*h* in the −X-axis composite-type electromagnet section generate a control magnetic field in the reverse direction to the biasing magnetic field.

Accordingly, when the rotary shaft 9 displaces from a predetermined position, the magnetic bearing control device 10 calculates a deviation between a position signal and target value given from the radial position sensors 6*x* and 6*y* and performs feedback control to reduce the deviation to zero, thereby returning the rotary shaft 9 to the predetermined position. That is, the magnetic bearing control device 10 has a control section 11 to perform predetermined operation, such as PID, on the deviation between the position signal and target value given from the radial position sensors 6*x* and 6*y* and generates a control signal to control the current amplifier section 12*x* and 12*y*, thereby varying a control current as an output thereof. Thereupon, the magnetic fields generated by the eight control coils 5*a*–5*h* vary. This varies the electromagnetic force by the +Y-axis composite-type electromagnet section 1*a*, −Y-axis composite-type electromagnet section 1*b*, +X-axis composite-type electromagnet 1*c* and −X-axis composite-type electromagnet 1*d*, thus returning the rotary shaft 9 to the predetermined position.

Hereunder, the operation of the radial magnetic bearing according to the invention will be explained in further detail with reference to FIG. 6 to FIG. 9. As discussed above, closed circuits are respectively formed in the direction of arrows through the +Y-axis composite-type electromagnet section 1*a*, −Y-axis composite-type electromagnet section 1*b*, +X-axis composite-type electromagnet 1*c*, and −X-axis composite-type electromagnet section 1*d* by the biasing permanent magnets thereof. Consequently, the rotary shaft 9 undergoes a magnetic attracting force due to biasing magnetic flux in equal amounts in four directions of +X axis, −X axis, +Y axis and −Y axis, being rotatably supported in a predetermined radial position.

Figure 6:
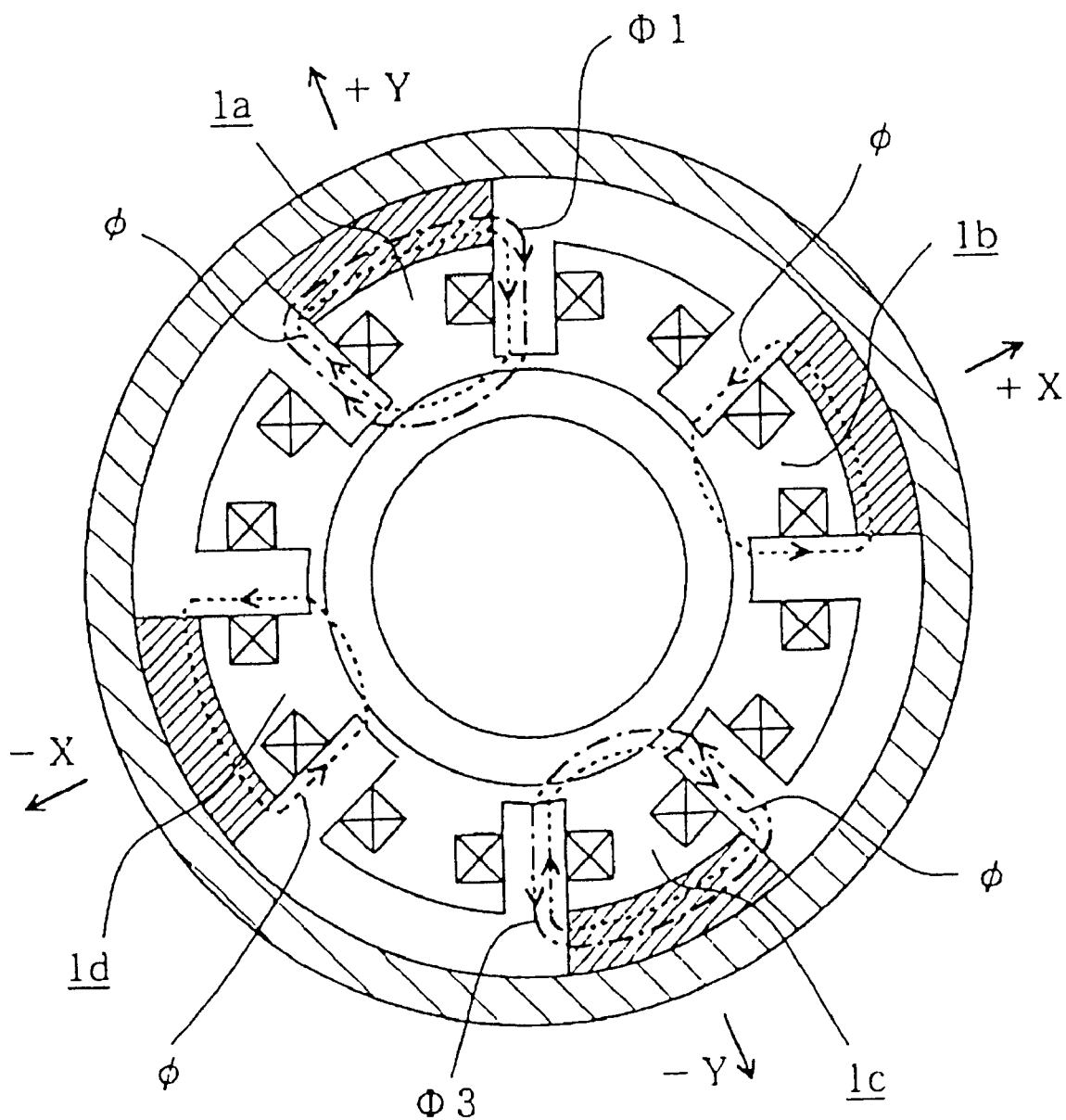
FIG. 6 is a figure for explaining the operation of the radial magnetic bearing of one embodiment of the invention.

It is herein assumed that disturbance occurs and the rotor displaces to move the rotary shaft 9 toward −Y. The Y-axis position sensor 6*y* detects a displacement of the rotary shaft 9 and inputs a detection signal to the control section 11 of the magnetic bearing control device 10. The control section 11 compares the detected signal from the radial position sensor 6*y* with a Y-axis direction target value signal to calculate a deviation signal, performs predetermined operation processing such as PID on the deviation signal to output a control signal, and supplies a control current through the Y-axis current amplifier section 12*y* to the control coils 5*a* and 5*b* of the +Y-axis composite-type electromagnet section 1*a* and the control coils 5*e* and 5*f* of the −Y-axis composite-type electromagnet section 1*c*. Thereupon, as shown in FIG. 6, a closed-circuit magnetic path with a control magnetic flux Φ1 is formed including the protruding poles 3*a* and 3*b* and the target 8. Further, a closed-circuit magnetic path with a control magnetic flux Φ3 is formed including the protruding poles 3*e* and 3*f* and the target 8. The control magnetic flux Φ1 is in the same direction as the direction of a biasing magnetic flux Φ. Consequently, the two magnetic fluxes are added together to thereby intensify the magnetic attracting force by the +Y-axis composite-type electromagnet section 1*a*. On the other hand, because the control magnetic flux Φ3 is in a direction reverse to a direction of the biasing magnetic flux Φ, the two magnetic fluxes are subtracted to thereby reduce the magnetic attracting force by the −Y-axis composite-type electromagnet section 1*c*. Due to this, the rotary shaft 9 immediately is returned to the predetermined position in the Y-axis direction and held in that position.

Figure 7:
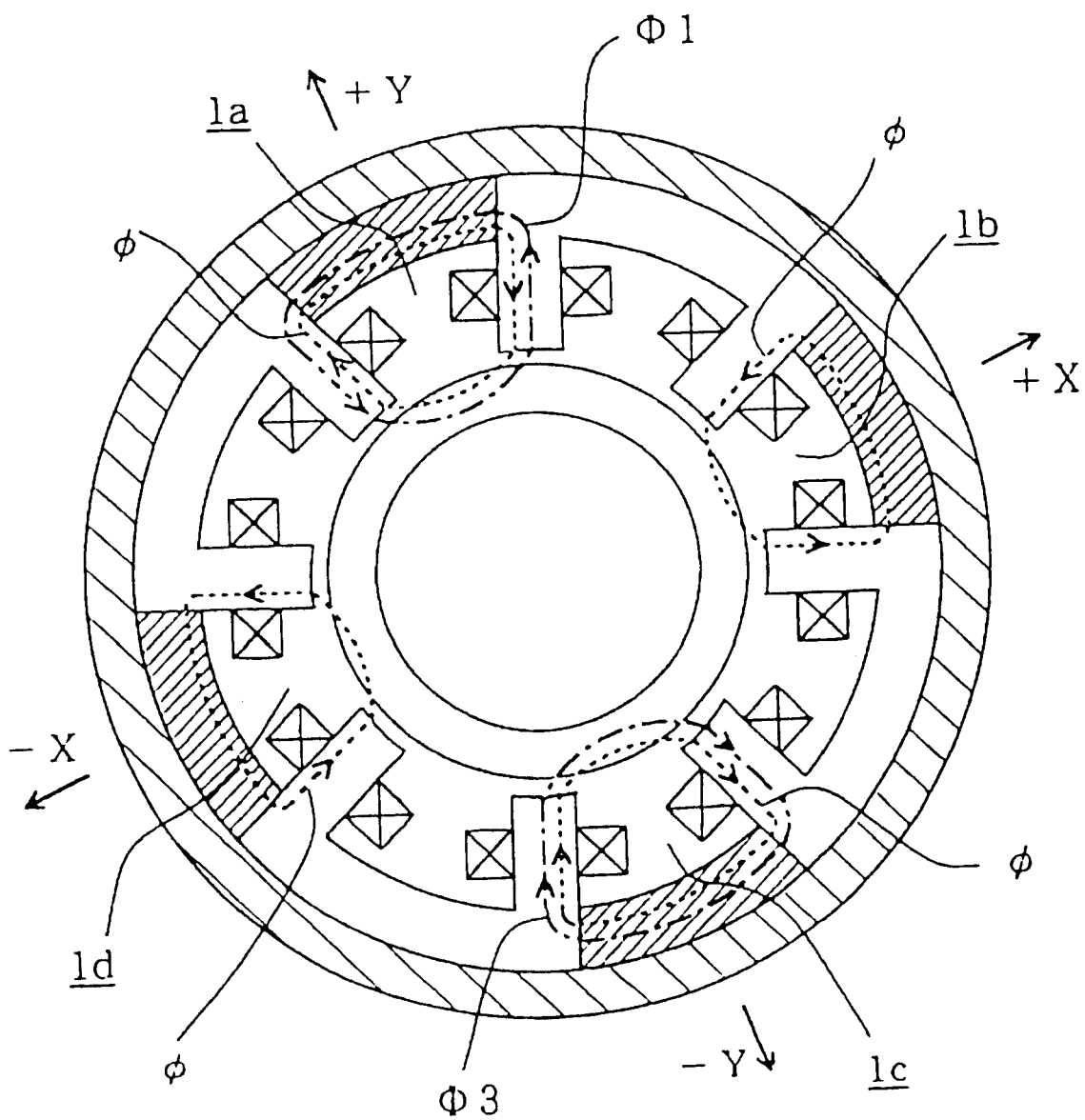
FIG. 7 is a figure for explaining the operation of the radial magnetic bearing of one embodiment of the invention.

In the case that the rotary shaft 9 shifts toward +Y, the Y-axis current amplifier section 12*y* supplies a control current to the control coils 5*a* and 5*b* of the +Y-axis composite-type electromagnet section 1*a* as well as the control coils 5*e* and 5*f* of the −Y-axis composite-type electromagnet section 1*c*, in the direction reverse to the control current supplied upon shifting the rotary shaft 9 toward −Y. Thereupon, as shown in FIG. 7, a closed-circuit magnetic path with a control magnetic flux Φ1 is formed including the protruding poles 3*a* and 3*b* and the target 8. Further, a closed-circuit magnetic path with a control magnetic flux Φ3 is formed including the protruding poles 3*e* and 3*f* and the target 8. The control magnetic flux Φ1 is in the direction reverse to the direction of a biasing magnetic flux ϕ. Consequently, the two magnetic fluxes are subtracted to thereby reduce the magnetic attracting force by the +Y-axis composite-type electromagnet section 1*a*. On the other hand, because the control magnetic flux Φ3 is in the same direction as the direction of the biasing magnetic flux ϕ, the two magnetic fluxes are added together to thereby intensify the magnetic attracting force by the −Y-axis composite-type electromagnet section 1*c*. Due to this, the rotary shaft 9 is immediately returned to the predetermined position in the Y-axis direction and held in that position.

Figure 8:
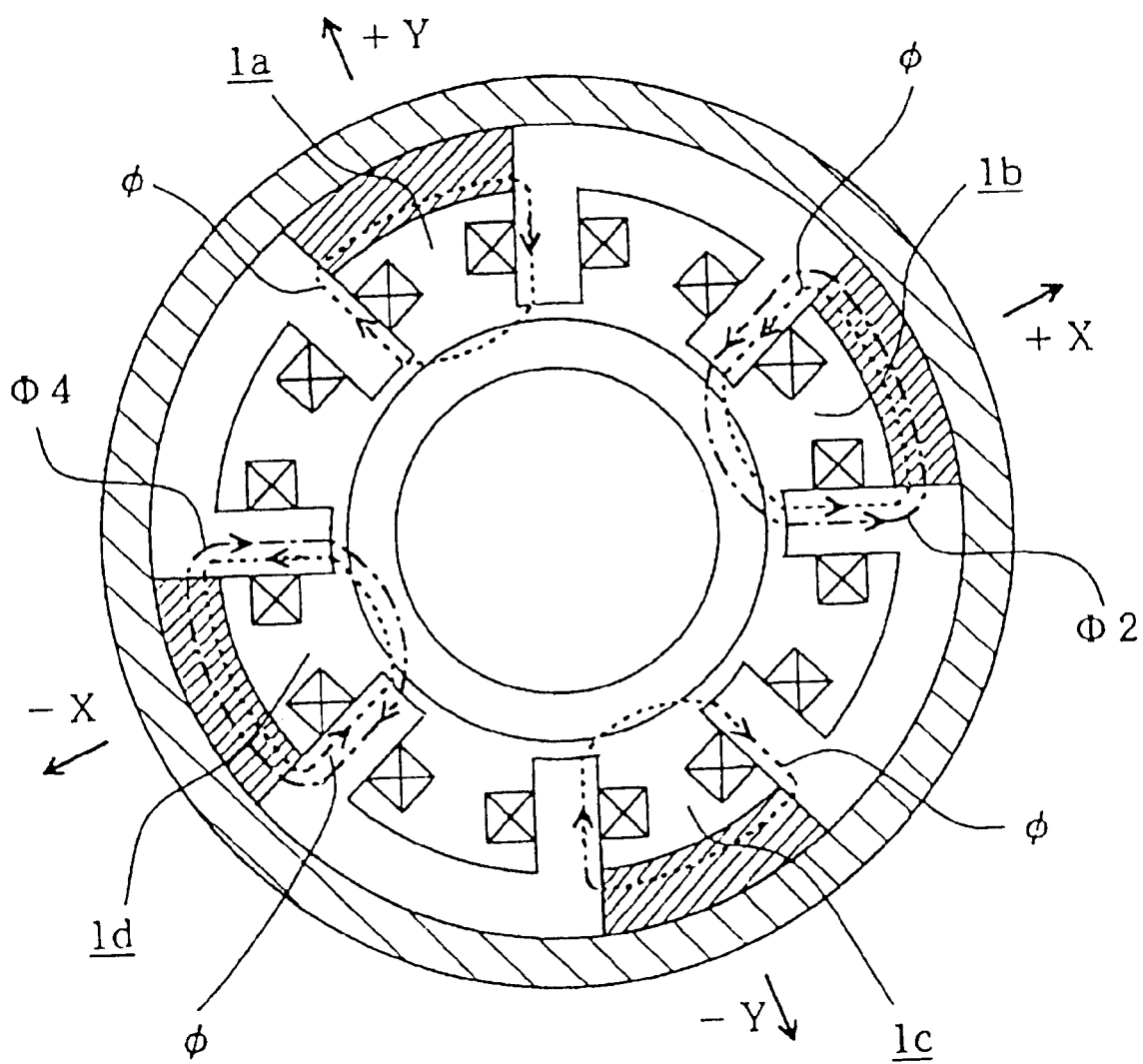
FIG. 8 is a figure for explaining the operation of the radial magnetic bearing of one embodiment of the invention.

Assuming that the rotary shaft 9 shifts toward −X, the X-axis position sensor 6*x* detects a displacement of the rotary shaft 9 and inputs the detected signal to the control section 11 of the magnetic bearing control device 10. The control section 11 compares the detected signal from the radial position sensor 6*x* with a Z-axis direction target value signal to calculate a deviation signal, performs predetermined operation processing such as PID on the deviation signal to output a control signal, and supplies a control current through the X-axis current amplifier section 12*x* to the control coils 5*c* and 5*d* of the +X-axis composite-type electromagnet section 1*b* and the control coils 5*g* and 5*h* of the −X-axis composite-type electromagnet section 1*d*. Thereupon, as shown in FIG. 8, a closed-circuit magnetic path with a control magnetic flux Φ2 is formed including the protruding poles 3*c* and 3*d* and the target 8. Further, a closed-circuit magnetic path with a control magnetic flux Φ4 is formed including the protruding poles 3*g* and 3*h* and the target 8. The control magnetic flux Φ2 is in the same direction as the direction of a biasing magnetic flux Φ. Consequently, the two magnetic fluxes are added together to thereby intensify the magnetic attracting force by the +X-axis composite-type electromagnet section 1*b*. On the other hand, because the control magnetic flux Φ4 is in the direction reverse to the direction of the biasing magnetic flux Φ, the two magnetic fluxes are subtracted to thereby reduce the magnetic attracting force by the −X-axis composite-type electromagnet section 1*d*. Due to this, the rotary shaft 9 is immediately returned to the predetermined position in the X-axis direction and held in that position.

Figure 9:
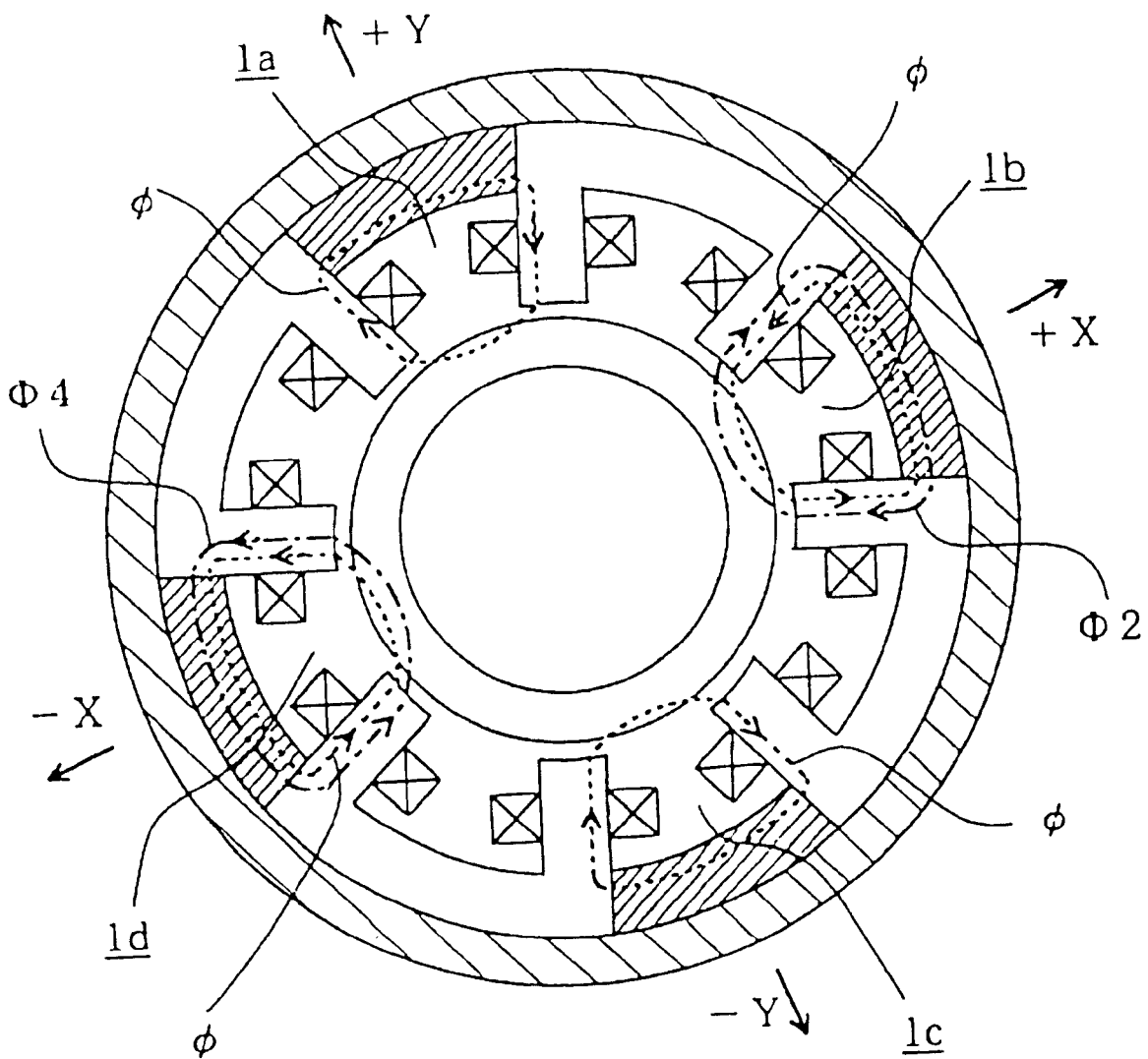
FIG. 9 is a figure for explaining the operation of the radial magnetic bearing of one embodiment of the invention.
Figure 10A:
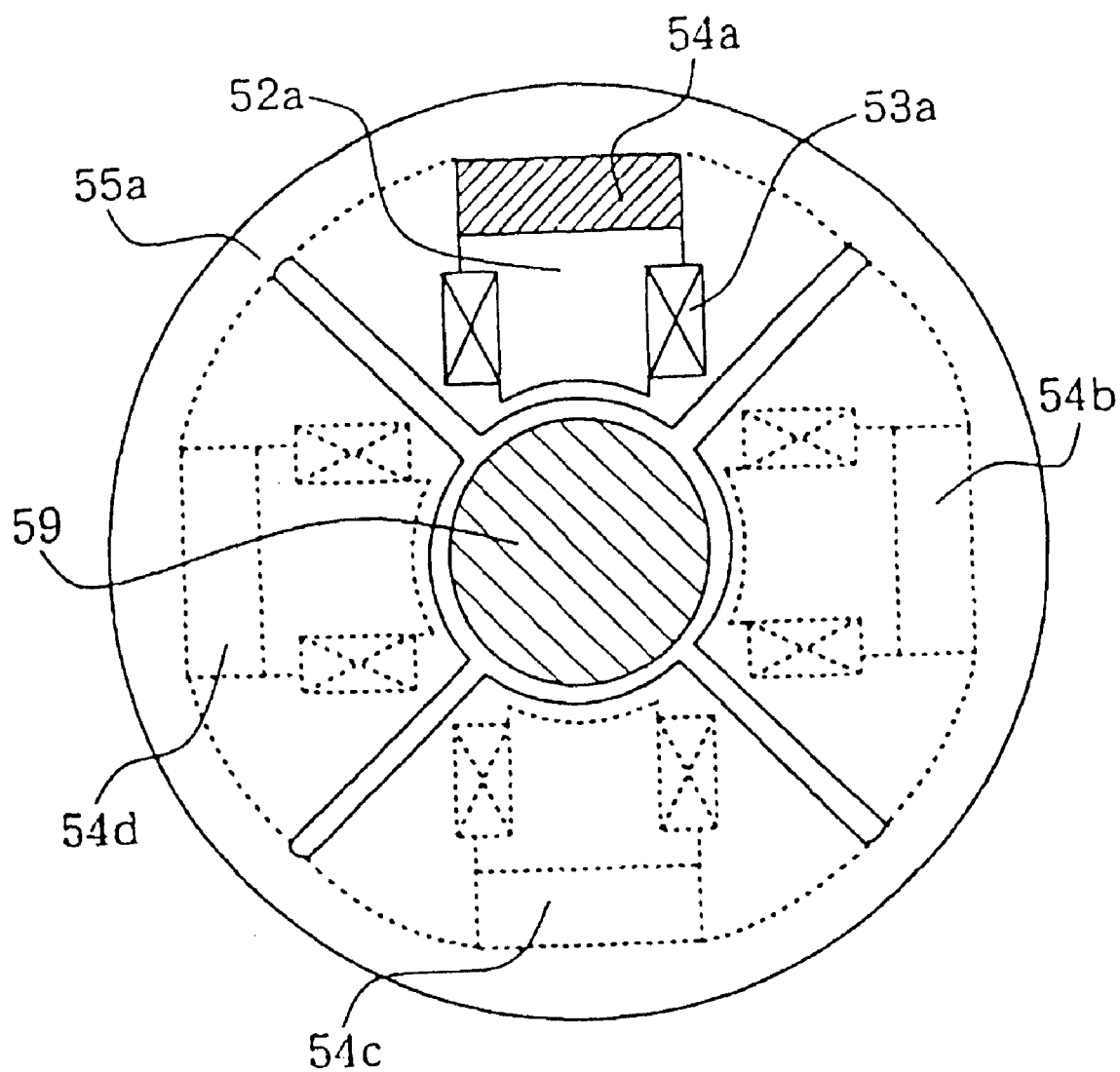
FIG. 10A is a cross sectional view.
Figure 10B:
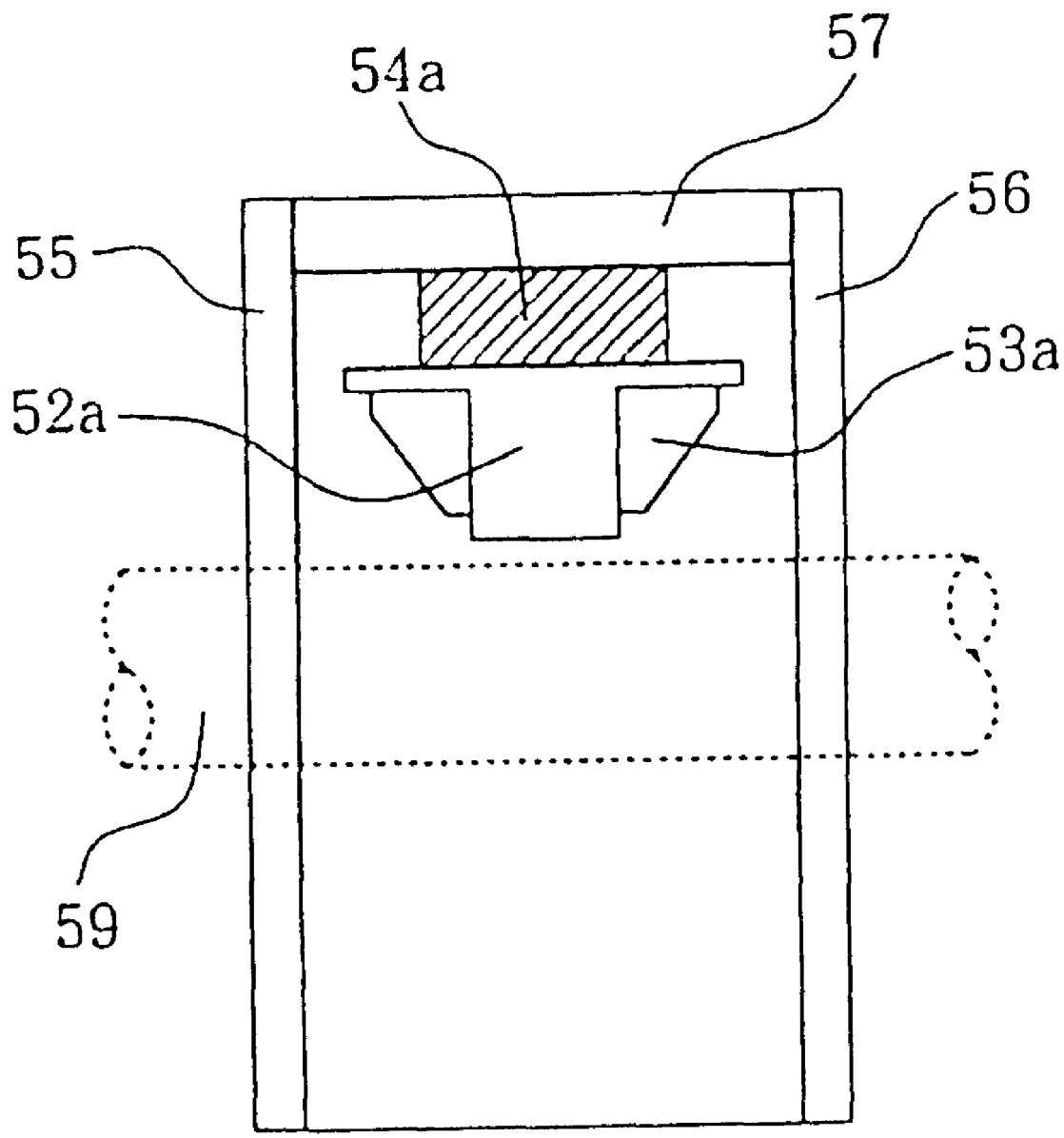
FIG. 10B is a longitudinal sectional view.
Figure 11A:
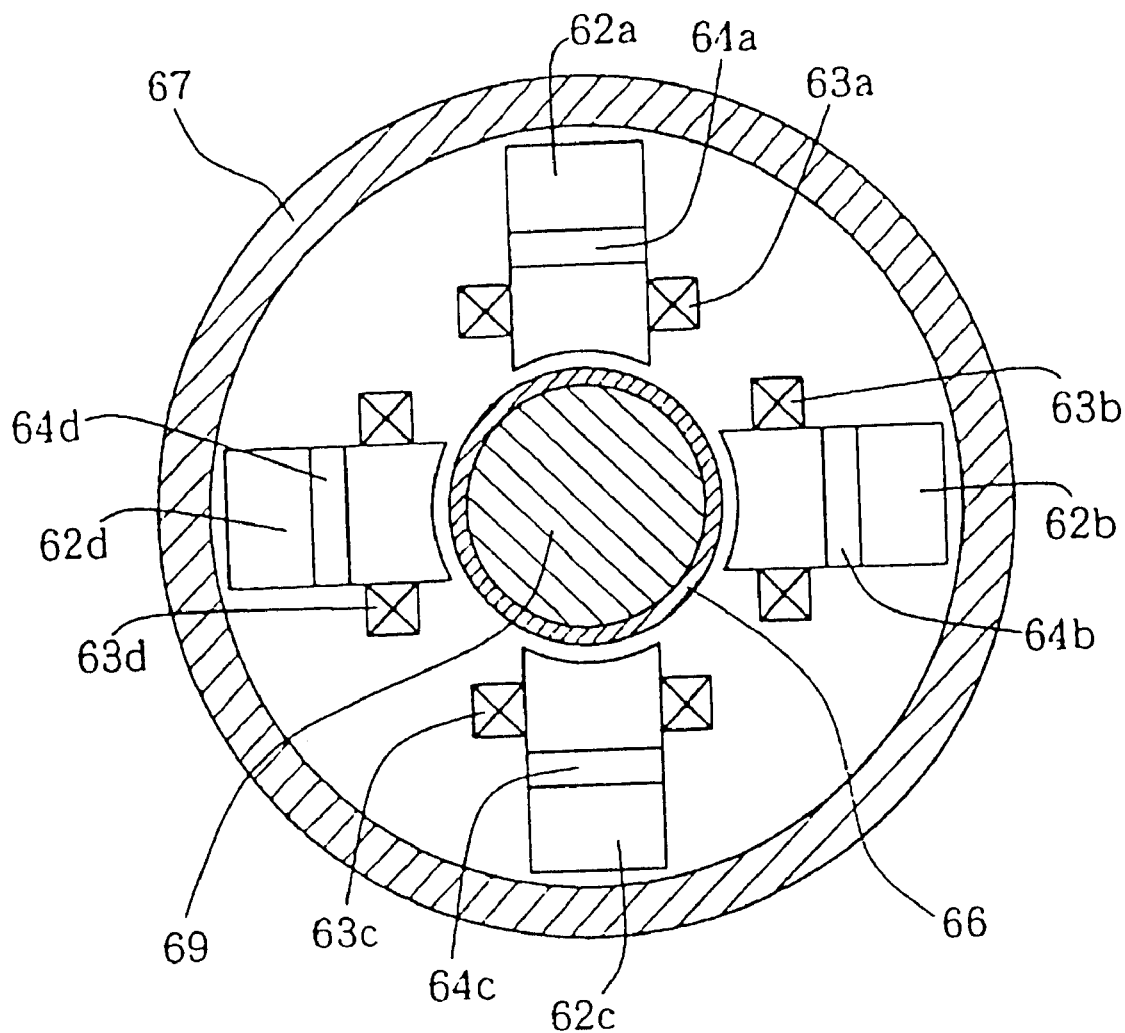
FIG. 11A is across sectional view.
Figure 11B:
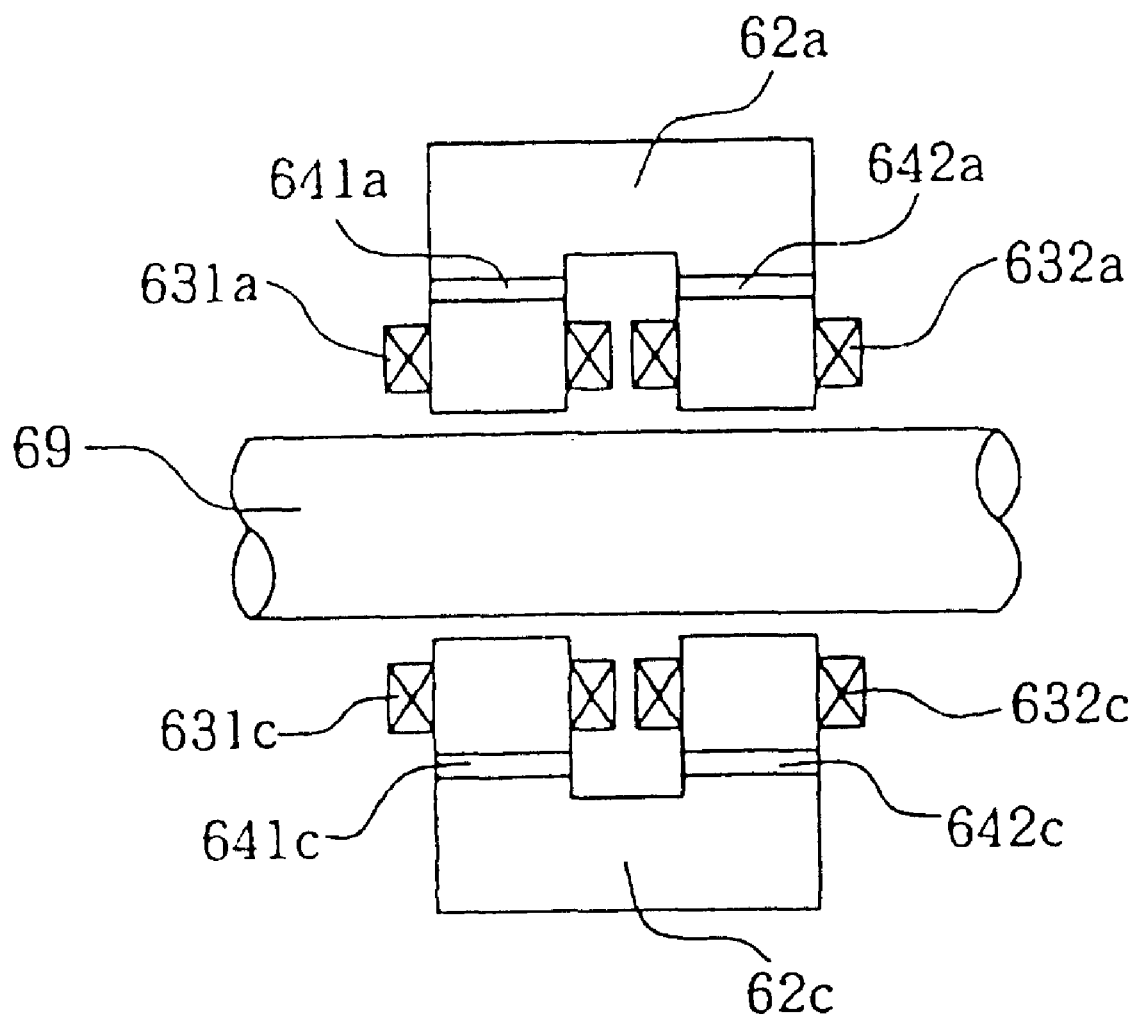
FIG. 11B is a longitudinal sectional view.
Figure 12A:
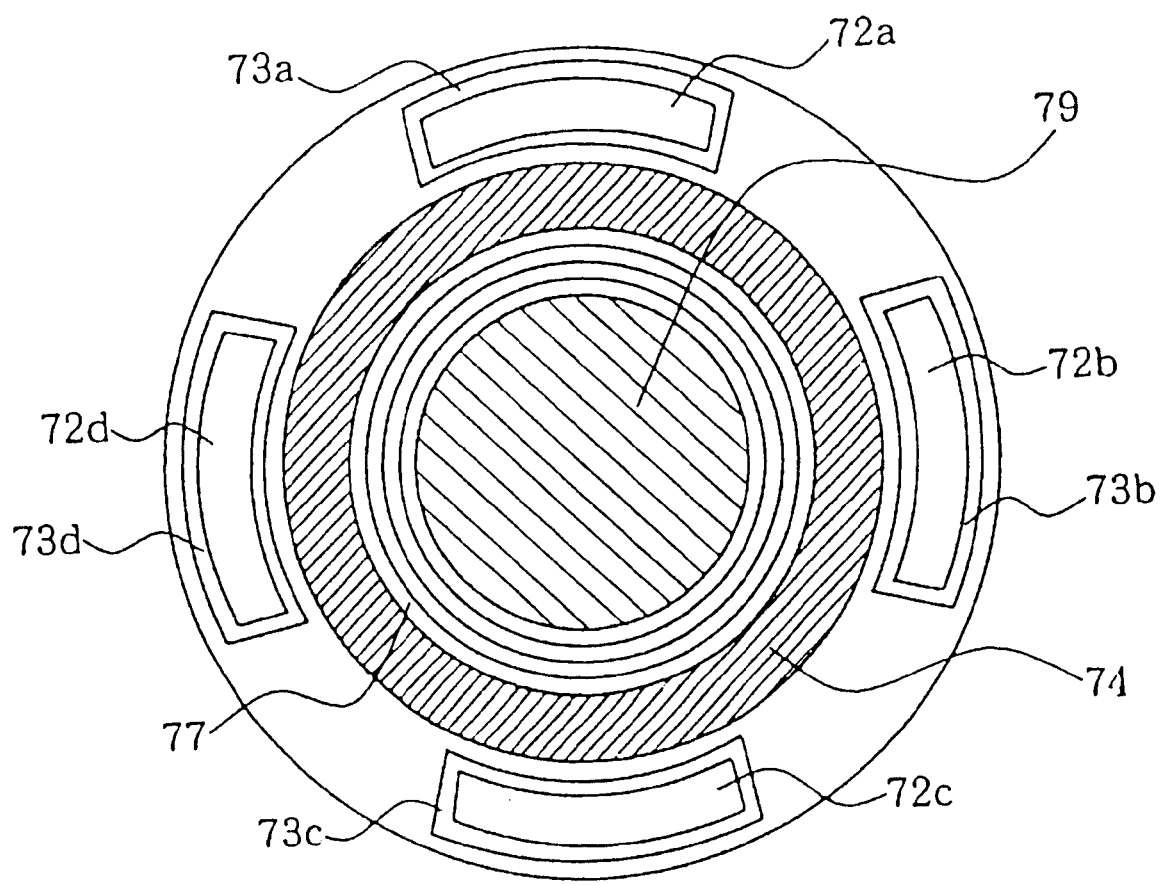
FIG. 12A is a cross sectional view.
Figure 12B:
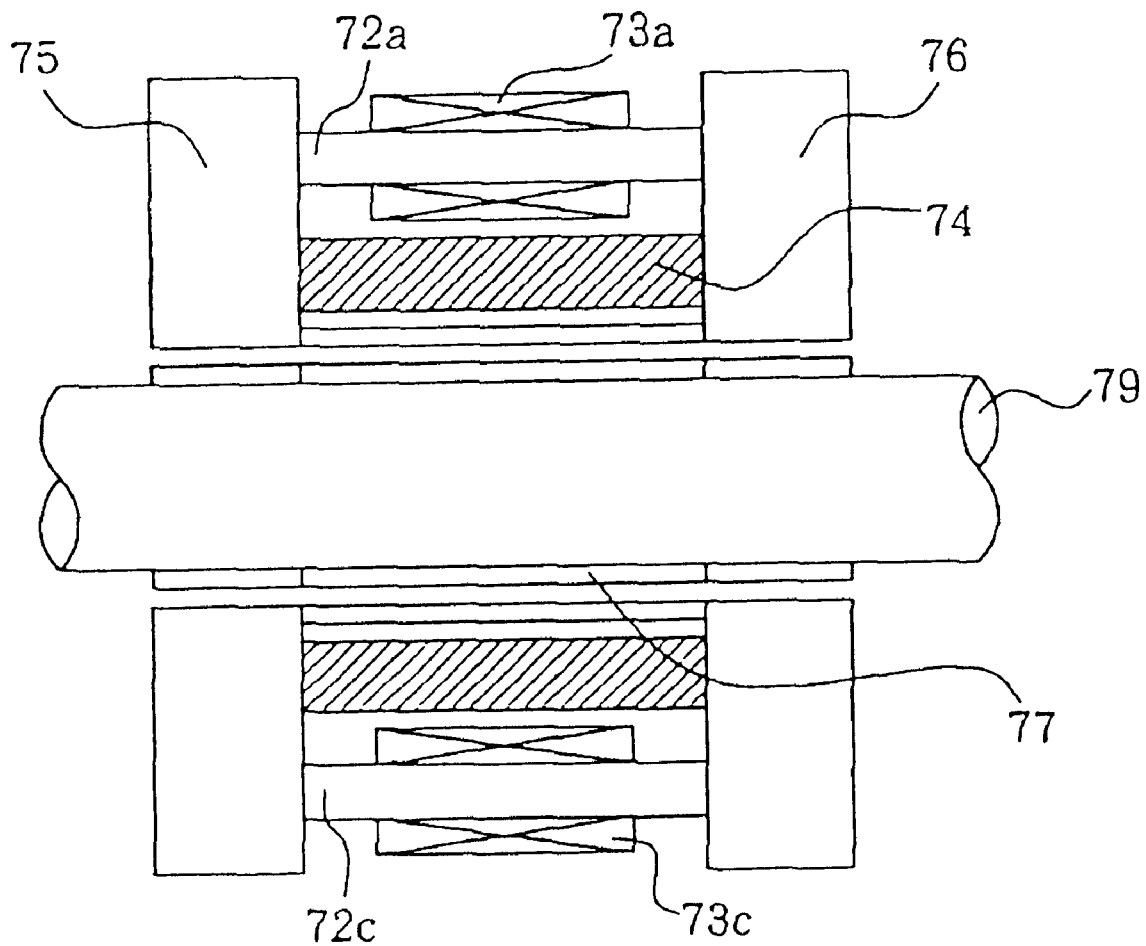
FIG. 12B is a longitudinal sectional view.

In the case that the rotary shaft 9 shifts toward +X, the X-axis current amplifier section 12*x* supplies a control current to the control coils 5*c* and 5*d* of the +X-axis composite-type electromagnet section 1*b* as well as the control coils 5*g* and 5*h* of the −X-axis composite-type electromagnet section 1*d*, in the direction reverse to the control current supplied upon shifting the rotary shaft toward −X. Thereupon, as shown in FIG. 9, a closed-circuit magnetic path with a control magnetic flux Φ2 is formed including the protruding poles 3c and 3d and the target 8. Further, a closed-circuit magnetic path with a control magnetic flux Φ4 is formed including the protruding poles 3g and 3h and the target 8. The control magnetic flux Φ2 is in the direction reverse to the direction of a biasing magnetic flux ϕ. Consequently, the two magnetic fluxes are subtracted to thereby reduce the magnetic attracting force by the +X-axis composite-type electromagnet section 1b. On the other hand, because the control magnetic flux Φ4 is in the same direction as the direction of the biasing magnetic flux ϕ, the two magnetic fluxes are added together to thereby intensify the magnetic attracting force by the −X-axis composite-type electromagnet section 1d. Due to this, the rotary shaft 9 is immediately returned to the predetermined position in the Y-axis direction and held in that position.

In the above, the invention was explained on its structure and operation by exemplifying the composite-type electromagnet for a radial magnetic bearing of FIG. 1. The invention is applicable not only, of course, to a composite-type electromagnet for a conventional radial magnetic bearing having a permanent magnet to provide a biasing magnetic field but also to the other structure of a composite-type electromagnet comprising an electromagnet having a control coil wound around a magnetic-material electromagnet core and a biasing permanent magnet having a junction to the electromagnet core. Also, the form of electromagnet cores 2a–2d and biasing permanent magnets 4a–4d constituting the composite-type electromagnet applied to the radial magnetic shown in FIG. 1 bearing is not limited to those shown in FIG. 1 to FIG. 3, but may be in other form provided that an annular body is formed arranged, at an equal interval, with two protruding poles on each of four horse-hoof composite-type electromagnets, i.e. totally eight protruding poles on which control coils are wound.

The present invention is characterized by, in a composite-type electromagnet comprising an electromagnet having a controlling coil wound around an electromagnet core of a magnetic material and a biasing permanent magnet having a junction between the electromagnet core and the permanent magnet, disposing in the junction a filling material made of a material having a high permeability and a high saturation magnetic flux density. Accordingly, it can be realized to minimize the leak of magnetic flux occurring at the junction, not to reduce the amount of magnetic flux available, and to prevent adverse effects upon an external member, apparatus or the like due to leak magnetic flux.

Also, the radial magnetic bearing according to the present invention has a composite-type electromagnet to provide a controlling magnetic field by a controlling electromagnet and a biasing magnetic field by a biasing permanent magnet to have a filling material having high permeability and a high saturation magnetic flux density disposed in a junction between the biasing permanent magnet and an electromagnet core of the controlling electromagnet. Accordingly, there is no possibility that magnetic flux leak outside through the junction. Consequently, the biasing magnetic flux and the controlling magnetic flux are all effectively utilized, enhancing bearing rigidity. Moreover, further structural simplification and size and weight reduction were achieved as compared to the conventional radial magnetic bearing having a biasing electromagnet.

What is claimed is:

1. A composite-type electromagnet comprising: an electromagnet having a controlling coil wound around an electromagnet core formed of a magnetic material; a biasing permanent magnet in contact with the electromagnet core so that only a minute gap exists at a junction between the electromagnet core and the permanent magnet; and a filling material having a high permeability and a high saturation magnetic flux density disposed in the minute gap.

2. A composite-type electromagnet according to claim 1; wherein the filling material is one of a viscous material, an adhesive material, a magnetic fluid, or a grease, and has therein a material having a high permeability and high saturation magnetic flux density.

3. A radial magnetic bearing comprising: a controlling electromagnet having a controlling coil wound around an electromagnet core formed of a magnetic material; a biasing permanent magnet in contact with the electromagnet core so that only a minute gap exists at a junction between the electromagnet core and the permanent magnet; and a filling material having a high permeability and a high saturation magnetic flux density disposed in the minute gap.

4. A radial magnetic bearing for supporting a shaft, comprising: an annular member formed by alternately arranging around the shaft four electromagnet cores each having two protruding poles and four biasing permanent magnets; an electromagnet formed of eight controlling coils wound around the protruding poles to form four composite-type electromagnet parts consisting of a +Y-axis composite-type electromagnet part, a −Y-axis composite-type electromagnet part, a +X-axis composite-type electromagnet part and a −X-axis composite-type electromagnet part, each composite-type electromagnet part being formed by the combination of a respective biasing permanent magnet, two opposite protruding poles adjacent each of the biasing permanent magnets, and two controlling coils wound around the protruding poles; and a filling material having a high permeability and a high saturation magnetic flux density disposed in a minute gap existing in a junction between each electromagnet core and biasing permanent magnet.

5. A radial magnetic bearing according to either of claim 3 or claim 4; wherein the filling material is one of a viscous material, an adhesive material, a magnetic fluid, or a grease, and has therein a material having a high permeability and high saturation magnetic flux density.

6. A radial magnetic bearing for rotatably supporting a shaft, comprising; a plurality of the composite-type electromagnets according to claim 1 arranged annularly to form four composite-type electromagnet parts consisting of a +Y-axis composite-type electromagnet part for supporting the shaft in the +Y-axis direction, a −Y-axis composite-type electromagnet part for supporting the shaft in the −Y-axis direction, a +X-axis composite-type electromagnet part for supporting the shaft in the +X-axis direction, and a −X-axis composite-type electromagnet part for supporting the shaft in the +X-axis direction.

7. A radial magnetic bearing according to claim 6; wherein the electromagnet cores each have two protruding poles and controlling coils wound around the protruding poles, and wherein each composite-type electromagnet part is comprised of a respective biasing permanent magnet, two opposite protruding poles adjacent each of the biasing permanent magnets, and the two controlling coils wound around the protruding poles.

8. A radial magnetic bearing for rotatably supporting a cylindrical shaft, comprising: a plurality of electromagnets each comprised of a core formed of a magnetic material and a coil wound around the core, the electromagnets being arranged annularly to surround the cylindrical shaft; a plurality of biasing permanent magnets disposed between adjacent ones of the electromagnets so each biasing permanent magnet abuts two of the cores and two of the biasing permanent magnets abut each core, each of the biasing permanent magnets being in direct contact with the two cores adjacent opposite ends thereof such that only a minute gap exists at a junction between each core and the adjacent permanent magnets; and a material having a high permeability and a high saturation magnetic flux density disposed in the minute gap.

9. A radial magnetic bearing according to claim 8; wherein the filling material is one of a viscous material, an adhesive material, a magnetic fluid or a grease, and has therein a material having a high permeability and a high saturation magnetic flux density.

10. A rotary device comprising: a housing; a cylindrical shaft disposed in the housing; and at least one magnetic bearing for supporting the shaft in the housing without coming into contact with the shaft, the at least one magnetic bearing comprising a plurality of electromagnets arranged annularly about the cylindrical shaft, and a permanent magnet disposed between adjacent electromagnet cores, each permanent magnet being in direct contact with two adjacent electromagnets disposed on opposite sides thereto so that only a minute gap exists between each permanent magnet and the two adjacent electromagnets, and a material having a high permeability and a high saturation magnetic flux density disposed in the minute gap.

11. A rotary device according to claim 10; wherein the electromagnets each comprise a core having legs protruding from opposite ends thereof and facing a radial center of the cylindrical shaft, and a controlling coil wound around each of the legs, the controlling coils being connected to form a plurality of composite-type electromagnet parts for maintaining the cylindrical shaft in a levitated state.

12. A rotary device according to claim 11; wherein each of the electromagnet parts consists of the combination of a respective permanent magnet, a leg of each of the two electromagnet cores adjacent to the respective permanent magnet, the controlling coils wound about the legs, and the material disposed in the minute gap.

13. A rotary device according to claim 10; wherein the material comprises one of a viscous material, an adhesive material, a magnetic fluid or a grease, and has therein a material having a high permeability and a high saturation magnetic flux density.

* * * * *